(12) United States Patent
Roberts

(10) Patent No.: US 8,387,263 B1
(45) Date of Patent: Mar. 5, 2013

(54) EASY USE UTENSIL

(76) Inventor: Michael L. Roberts, Laguna Beach, CA (US)

( * ) Notice: Subject to any disclaimer, the term of this patent is extended or adjusted under 35 U.S.C. 154(b) by 0 days.

(21) Appl. No.: 13/412,456

(22) Filed: Mar. 5, 2012

Related U.S. Application Data

(60) Continuation-in-part of application No. 29/410,228, filed on Jan. 5, 2012, now Pat. No. Des. 658,017, which is a division of application No. 29/409,657, filed on Dec. 27, 2011, now Pat. No. Des. 655,138.

(51) Int. Cl.
*A47J 43/28* (2006.01)

(52) U.S. Cl. ............................ 30/324; 16/430

(58) Field of Classification Search ............ 30/324–328, 30/322, 323; 16/430
See application file for complete search history.

(56) References Cited

U.S. PATENT DOCUMENTS

| | | | | |
|---|---|---|---|---|
| 3,202 | A | * 7/1843 | Gardner | ........................ 137/213 |
| 2,338,980 | A | 1/1944 | Stratton | |
| 2,574,679 | A | 11/1951 | Woodburn | |
| 2,640,263 | A | 1/1953 | A. Dieterich | |
| 2,751,683 | A | 6/1956 | Johns | |
| 2,770,877 | A | * 11/1956 | Bird | ................ 30/123 |
| 4,524,513 | A | 6/1985 | Intini, Jr. | |
| 4,984,367 | A | 1/1991 | Albanese | |
| 5,975,305 | A | * 11/1999 | Barger | ........................ 206/572 |
| 6,640,448 | B2 | 11/2003 | Mardell | |
| 6,701,625 | B1 | 3/2004 | Thomason et al. | |
| 6,722,043 | B2 | 4/2004 | Teng | |
| 6,733,056 | B2 | 5/2004 | Daniele | |
| 6,895,672 | B2 | 5/2005 | Conforti | |
| 7,047,648 | B1 | 5/2006 | LeBel et al. | |
| 2004/0006874 | A1 | * 1/2004 | Kamm et al. | ................ 30/141 |
| 2006/0191146 | A1 | * 8/2006 | Chao | ................ 30/324 |
| 2008/0256807 | A1 | 10/2008 | Kirkup | |
| 2010/0011592 | A1 | 1/2010 | Hougland | |
| 2010/0147885 | A1 | 6/2010 | Braxton et al. | |

FOREIGN PATENT DOCUMENTS

| CN | 2631356 | 8/2004 |
|---|---|---|
| CN | 201044697 | 4/2008 |

OTHER PUBLICATIONS

U.S. Appl. No. 29/409,657, filed Dec. 27, 2011, Roberts.

\* cited by examiner

*Primary Examiner* — Kenneth E. Peterson
(74) *Attorney, Agent, or Firm* — Cislo & Thomas, LLP

(57) ABSTRACT

A utensil in the form of a spoon having a spill resistant bowl. The bowl may have an angled tip at the front portion of the bowl and a secondary reservoir at or near the rear portion of the bowl. In some embodiments, portions of the inner surface of the bowl may be textured near the perimeter edge along the sides of the bowl. The utensil may also have an ergonomic handle having a depression on the top and concavity on the bottom with a flattened portion at the rear end. The flattened portion allows the utensil to stand upright.

4 Claims, 3 Drawing Sheets

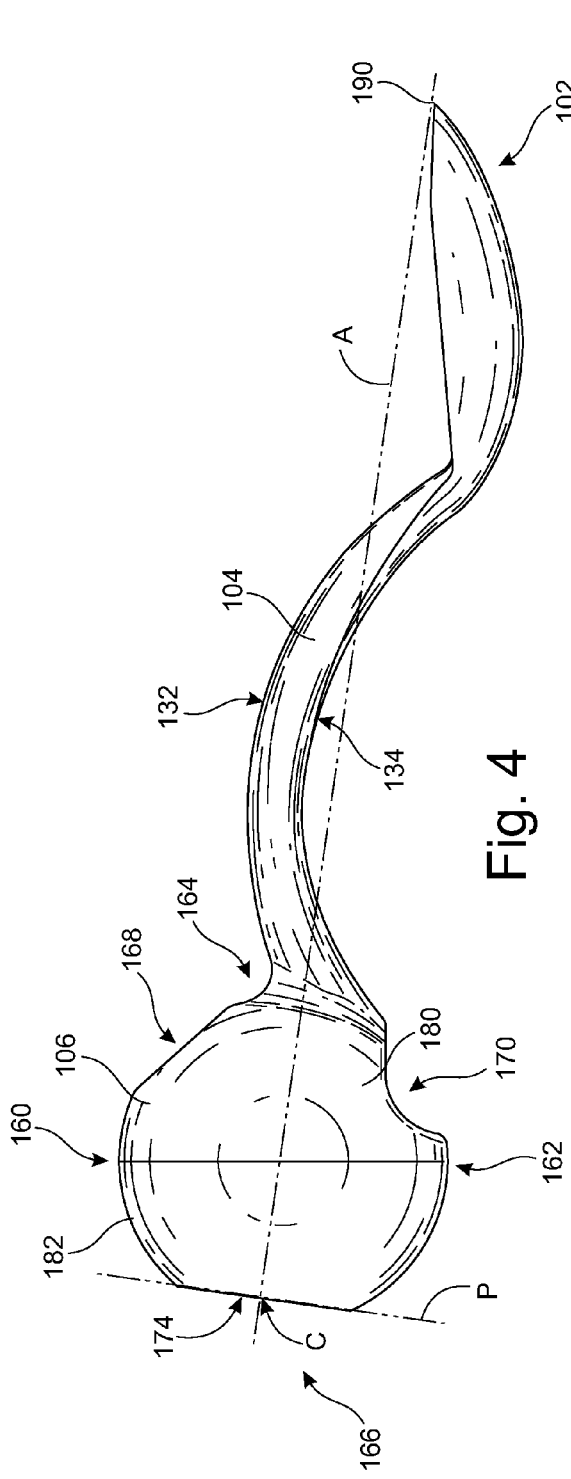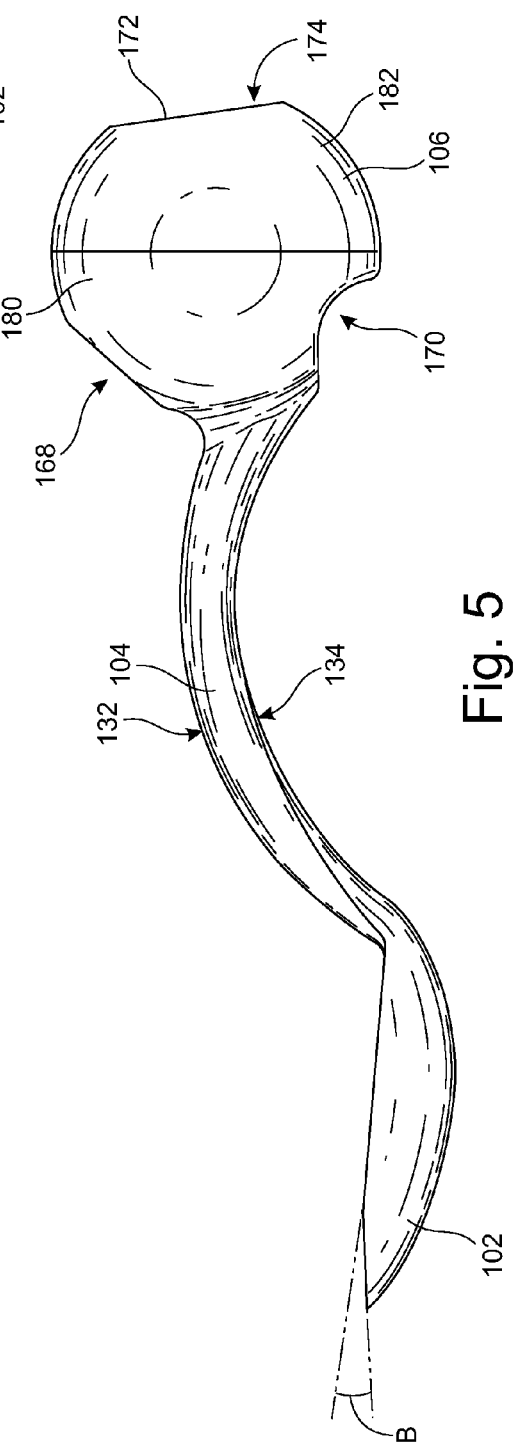

EASY USE UTENSIL

CROSS-REFERENCE TO RELATED APPLICATION

This patent application is a continuation-in-part application of U.S. patent application Ser. No. 29/410,228, filed Jan. 5, 2012, entitled "Easy Grip Handle," which is a divisional of U.S. patent application Ser. No. 29/409,657 (now U.S. Pat. No. D655,138) entitled "Spill Resistant Spoon," filed Dec. 27, 2011, which applications are incorporated in their entirety here by this reference.

TECHNICAL FIELD

This invention relates to utensils that are easy to control and use, and particularly, to a spoon that is easy to control and minimizes spillage of liquid in the spoon.

BACKGROUND

The elderly and the young share a common problem in that members of each group have difficulty with fine motor skills. For the young, an underdeveloped nervous system and muscular system create challenges in fine motor movement. For the elderly, a deteriorating nervous system and muscular system create challenges in fine motor movement. These challenges to fine motor movement caused problems in everyday activity, including eating.

Holding a spoon steady is difficult when fine motor movement is challenged. This causes the user to spill food all over the table. This is particularly challenging when the food is in liquid form, such as soups.

Utensils have been designed to address this problem. For example, some spoons utilize walls and covers protruding from the perimeter edge of the bowl the spoon. These walls, although presumably effective in preventing spillage, are a hindrance to the eating experience, either because the spoon no longer fits in the mouth comfortably or because it is difficult to scoop up the food.

Utensil handles can also be a challenge to those having difficulty with their fine motor skills. In particular, utensil handles tend to be an elongated stems. This may make it difficult for a user to hold and balance the utensil. In addition, since the handles tend to be elongated stems, utensils simply rest flat on a tabletop with portions of the utensil that enter the mouth being exposed to whatever germs the utensil picks up from the tabletop.

For the foregoing reasons there is a need for a utensil that is easy to control, use, and manage.

SUMMARY

In one aspect, the present invention is directed to a spoon that reduces the potential for spilling foodstuff, in particular, liquids. The spoon comprises a bowl that may have an angled tip.

In another aspect of the invention, the inner surface of the bowl may have texturing.

In another aspect of the invention, the spoon may have a secondary reservoir into which fluid can freely flow from the bowl to the secondary reservoir and back again depending on how the user holds the spoon.

In another aspect of the invention, the handle of the spoon may be bulbous in shape for easy grasping, balancing, and use. In some embodiments, the bulbous handle may further comprise contours for an ergonomic grip. In some embodiments, the handle may further comprise a flattened portion configured to allow the spoon to stand up right on the handle to prevent the bowl from touching the tabletop.

In another aspect of the invention, the spoon may utilize any combination of an angled tip, a textured surface, a secondary reservoir, and an ergonomic handle.

In another aspect of the invention, the handle may be applied to other utensils such as forks, knives, ladles, spatulas, and the like.

BRIEF DESCRIPTION OF DRAWINGS

FIG. 4 shows a side view thereof;
FIG. 5 shows another side view thereof.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
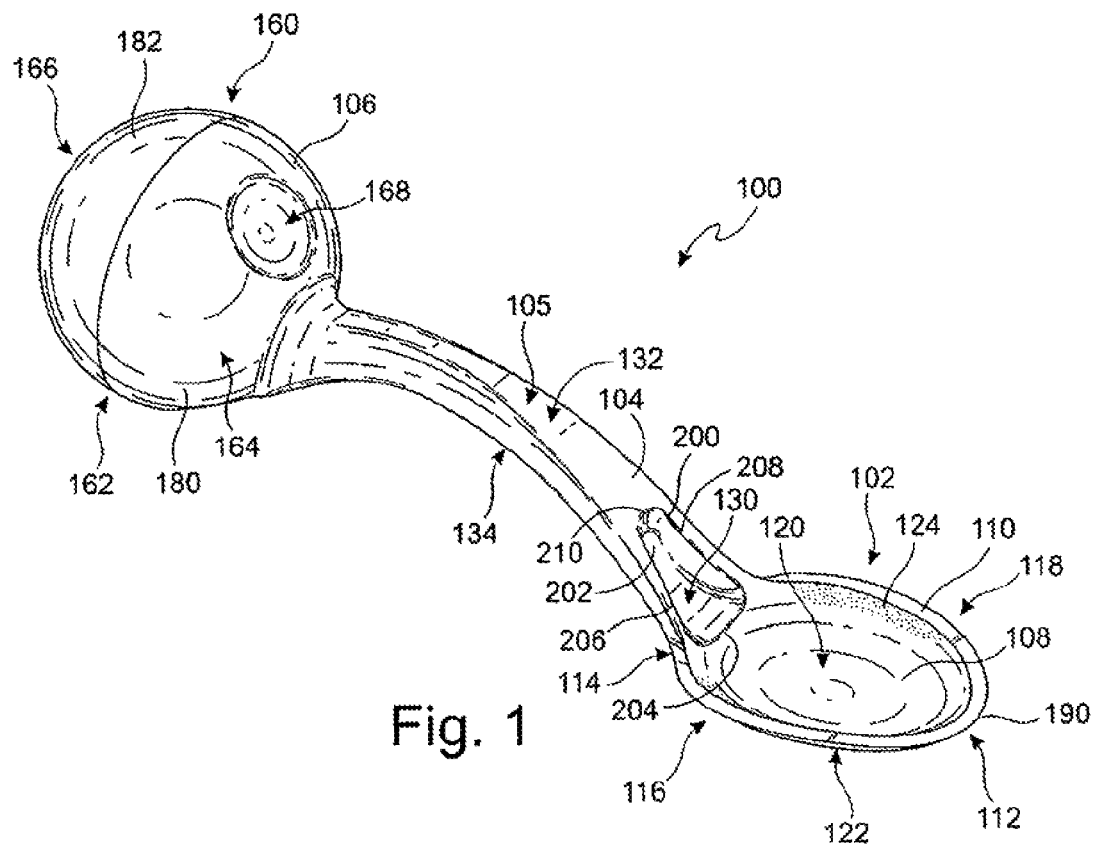
FIG. 1 shows a perspective view of an embodiment of the present invention.
Figure 2:
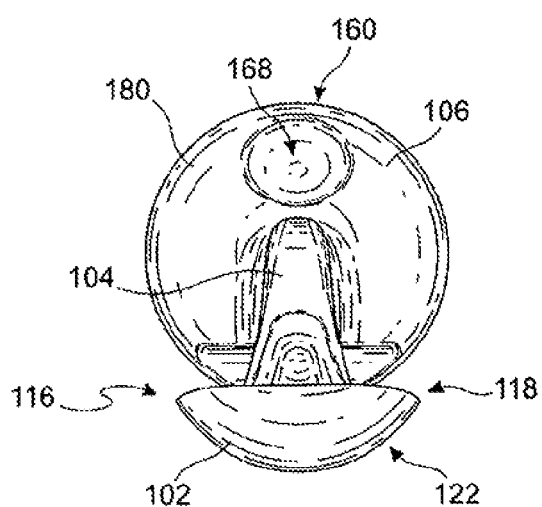
FIG. 2 shows a front view thereof.

With reference to FIG. 1, in some embodiments, the easy use utensil is a spoon 100 comprising a bowl 102, an arm 104 attached to the bowl 102, and a handle 106 attached to the arm 104. For the sake of clarity and ease of description, without being limiting, the spoon 100 is described with the understanding that the views shown in FIGS. 4 and 5 are considered to be a neutral position. In other words, the neutral position is the position that the spoon 100 is held in after scooping foodstuff or liquid into the bowl 102 with the intention of keeping the foodstuff or liquid in the bowl 102. Thus, in general in the neutral position the perimeter edge 110 of the bowl 102 at the sides 116, 118 is generally parallel to the ground or table. In addition, for the sake of clarity and ease of description, without being limiting, the handle 106 will be considered the back or rear end and the bowl 102 will be considered the front or forward end. The top will be considered the portion of the bowl where the food is placed and the bottom will be the opposite side. The upright position will be considered the position of the spoon (or utensil) when the active portion of the utensil (bowl of a spoon, prongs of a fork, cutting portion of a knife, etc.) is held substantially directly above the handle.

With reference to the Figures, the bowl 102 of the spoon 100 comprises a concave inner surface 120 and a convex outer surface 122, the inner surface 120 and the outer surface 122 terminating along a perimeter edge 110. The bowl 102 comprises a body 108 having a front portion or area 112, a rear portion or area 114 opposite the front portion 112 and attached to the arm 104, and two side portions or areas 116, 118 opposite each other and adjacent to the front and rear portions 112, 114.

The perimeter edge 110 along the two side portions 116, 118 may be generally flat or level. However, the perimeter edge 110 along the front portion 112 angles slightly downward relative to the perimeter edge 110 along the two side portions 116, 118. The angle B of downward deflection (as seen in FIG. 5) relative to the perimeter edge 110 along the two side portions 116, 118 may range from approximately 1 degrees to approximately 45 degrees. Preferably, the angle of downward deflection B is approximately 5 degrees to approximately 30 degrees. More preferably, the angle downward deflection B is approximately 10 degrees to approximately 20 degrees.

In some embodiments, portions of the inner surface 120 adjacent to the perimeter edge 110 along the two side portions 116, 118 may have a textured surface 124. The textured surface 124 refers to a non-smooth surface that is distinguishable from the normally smooth surface of typical spoons that would allow food items to slide off easily. Due to the surface tension of liquids, the textured surface 124 reduces the ability of the liquid inside the bowl 102 to spill out over the perimeter edge 110 when the spoon 100 is tilted towards one of its sides 116, 118. The surface tension of the liquid allows the liquid to cling on to the textured surface 124.

The textured surface 124 can be created by adding small protrusions on the inner surface 120 of the spoon 100. For example, small, raised bumps or dome shaped bumps may be created on the inner surface 120 of the spoon 100. These bumps may themselves be smooth; however, when numerous bumps are arranged proximal to each other, they create a textured surface on the spoon 100. Due to the smoothness of these bumps on the micro level, the texturing will not cause irritation to the lips should the lips make contact with these bumps during use.

In some embodiments, the texturing may be created by rough protrusions, thus, the texturing may be akin to sandpaper. In some embodiments, rather than protrusions, small cavities or dimples can be created into the inner surface 120 of the bowl 102 to create the textured surface. In some embodiments, the combination of protrusions and cavities may be utilized.

The extent of any texturing may be limited to the sides 116, 118 of the bowl 102. For example, the texturing may terminate before the angled front portion 112. This creates a path of least resistance at the front portion 112 or the rear portion 114 of the bowl 102. Therefore, liquid in the bowl 102 would most likely flow out the front portion 112 and into a user's mouth, or the rear portion 114 into a secondary reservoir 130.

The secondary reservoir 130 may be on or near the rear portion 114 of the bowl 102. For example, the secondary reservoir 130 may be on the arm 104, in between the arm 104 and the back portion 114 of the bowl 102, on the rear portion 114 of the bowl 102, or some combination thereof. Collectively, these positions will be referred to as a junction where the arm 104 meets the bowl 102.

Like the bowl 102, which defines a primary reservoir, the secondary reservoir 130 comprises a second concave inner surface 202 terminating at a second perimeter edge 200 defining an open face on the top surface of the spoon 100. Since the entire second inner surface 202 is below the second perimeter edge 200, the secondary reservoir 130 can also contain liquids when the handle 106 is tilted slightly downward from the neutral position. In some embodiments, portions of the second inner surface 202 near the second perimeter edge 200 may also be textured similar to the bowl 102.

Since the spoon 100 may be designed to pass liquid from the bowl 102 to the secondary reservoir 130 and back again, the bowl 102 and secondary reservoir 130 are in open communication with each other, meaning there is minimal obstruction to hinder or interfere with the flow of a liquid from the bowl 102 to the secondary reservoir 130 when the bowl 102 and handle 106 are tilted up and down from the neutral position. Similarly, in the preferred embodiment, there would be no texturing in the secondary reservoir 130 at the front perimeter edge 204 directly adjacent to the bowl 102.

Although a small tunnel can be created to connect the inner surface 120 of the bowl 102 to the second inner surface 202 of the secondary reservoir 130 for fluid transmission between the two reservoirs, such an embodiment has a disadvantage in that the tunnel can be difficult to clean. Improper cleaning can lead to bacteria and mold growth. In addition, if food particles get stuck in the tunnel, it will hinder the function of the spoon 100.

Nonetheless, the tunnel could have the advantage of reducing any spillage of liquids over the sides 116, 118 when the spoon 100 is tilted away from its neutral position. Such advantage can also be realized by creating a smooth transition from the bowl 102 to the reservoir 130. In some embodiments, to reduce the possibility of spillage over the sides 116, 118 a front perimeter edge 204 of the secondary reservoir 130 can be positioned below the perimeter edge 110 of the bowl 102 at the sides 116, 118. In other words, the front perimeter edge 204 of the secondary reservoir 130 would be below a plane defined by the perimeter edge 110 of the bowl 102 at the sides 116, 118. In addition, to maximize the volume the secondary reservoir 130 can hold, portions of the second perimeter edge 200, such as the portions along the side perimeter edges 206, 208 and/or the rear perimeter edge 210 of the secondary reservoir 130, may be positioned above the perimeter edge 110 of the bowl 102 when the spoon 100 is held in the neutral position.

The perimeter edge 200 of the secondary reservoir 130 can take on any shape, such as circular, oval, triangular, square, rectangular, hexagonal, and the like. Preferably, the front perimeter edge 204 is wider than the rear perimeter edge 210. Therefore, in the preferred embodiment, the shape of the secondary reservoir 130 is generally triangular or teardrop shape. This allows better control of transitioning the fluid in the bowl 102 to the secondary reservoir 130 and back again.

Except for the possibility of having a secondary reservoir 130, the arm 104 is typical of most spoons extending from the bowl 102 to the handle 106 with the arm having a center 105. In general, the arm 104 arches upwardly, thereby having a convex top surface 132 and the concave bottom surface 134. The arm 104 also differs from other spoons and utensils in that the degree of the arch will be dependent of the remainder of the spoon configuration so as to balance properly as described further below.

The arm 104 terminates at the handle 106. In the preferred embodiment, the handle 106 is bulbous in shape. In other words, the handle 106 is generally spherical with a few minor modifications. The handle 106 may be described as having a top portion or area 160, a bottom portion or area 162 opposite the top area 160, a front portion or area 164 adjacent to the arm 104, and a back portion or area 166 opposite the front area 164.

The handle 106 further comprises strategically located contours for an ergonomic grip. Due to the bulbous nature of the handle 106, these contours are located on the outer surface of the handle 106. For example, along the top area 160 towards the front area 164, the handle 106 may have a depression 168. Along the bottom area 162 towards the front area 164, the handle 106 may have a concavity 170. The depression 168 and concavity 170 together facilitate holding of the handle 106. When properly held with an overhand grip, the thumb may be positioned on the depression 168 and either the index finger or middle finger can be positioned on the concavity 170. This provides for a more secure and steady grip of the handle. Additional contours may be added in the appropriate position to accommodate any other finger.

The back area 166 of the handle 106 may have a flattened portion 172. The flattened portion 172 may be a flat surface or may be created by a depression 174. The angle and the arrangement of the flattened portion 172 relative to the rest of the spoon 100 is such that when the spoon 100 is positioned on the flattened portion 172, the spoon 100 can stand upright unassisted. In other words, based on the configuration of the arch in the arm 104 and the positioning of the bowl 102 relative to the arm 104 and the handle 106, the spoon 100 can balance when placed on the flattened portion 172. Allowing the spoon 100 to balance in an upright configuration makes it easier to grab the spoon 100. In addition, the flattened portion 172 allows the bowl 102 of the spoon 100 to stay off of a tabletop surface and reduce contamination with germs from the tabletop surface.

To facilitate this balance, the spoon 100 has a specific configuration. In the preferred embodiment, the flattened portion 172 is circular and defines a center C and a plane P. Any other geometric shape may work. As shown in FIG. 4, in the preferred embodiment, the spoon 100 is configured such that an axis A substantially perpendicular to the plane P and running through the center C of the flattened portion 172 intersects a tip 190 of the bowl 102 of the spoon 100, the tip 190 being a point on the bowl 102 farthest from the center C of the flattened portion 172. The axis A need not be exactly perpendicular to the plane P, so long as the spoon 100 can still balance on the flattened portion 172. The ability of the spoon 100 to balance on the flattened portion 172 depends on the size of the flattened portion relative to the weight of the spoon 100 and the distribution of that weight about the axis A. The axis A may substantially pass through the center of gravity of the spoon.

Nonetheless, the larger the flattened portion 172, the less the weight distribution becomes a factor. The smaller the flattened portion, the more important the weight distribution becomes. Therefore, whether the axis passes through the center of gravity or simply passes near the center of gravity depends on the size of the flattened portion 172 and the weight distribution of the spoon 100.

To reduce the possibility of the spoon 100 from falling over when placed on its flattened portion 172, flattened portion 172 may be created by a depression 174. In the preferred embodiment, the depression creates cylindrical wall 176. A tabletop or tray may have a reciprocal peg or protrusion that tightly fits into the depression 174 via a resistance fit. In some embodiments, the cylindrical wall 176 of the depression 174 and the reciprocal peg may have threading so as to screw onto each other for a more secure fit. Other types of quick fastening mechanisms can also be used such as magnets, buttons, hook and loop fasteners, and the like. In such embodiments, the precise balancing configuration of the spoon 100 is less important.

In some embodiments, the handle 106 may be a two-piece spherical unit. The first piece 180 may be integrally formed with the arm 104 or detachably connected to the arm 104. The second piece 182 may be detachably connected to the first piece 180. For example, the second piece 182 may either screw on or snap on to the first piece 180. The interior of the handle 106 may be hollow. This allows other items to be placed inside the handle 106. For example, small beads, pebbles, and the like may be placed inside the handle 106 so as to create a rattle for infants or toddlers, or medicine and pills may be placed inside for adults. If such an embodiment is desired, the handle 106 may also have a locking mechanism so as to reduce the possibility that the infant or toddler can open the handle 106 causing the small beads or medicine to fall out, which would result in a choking hazard.

Figure 3:
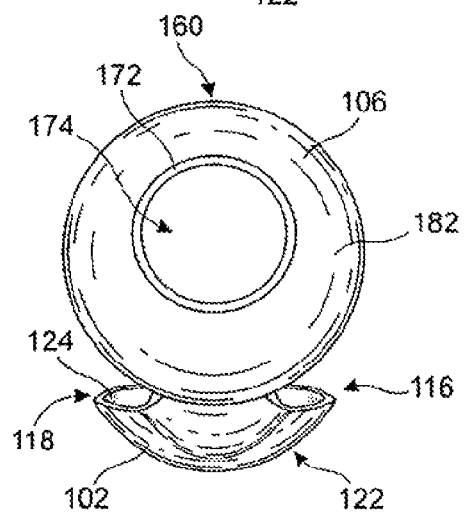
FIG. 3 shows a rear view thereof.
Figure 6:
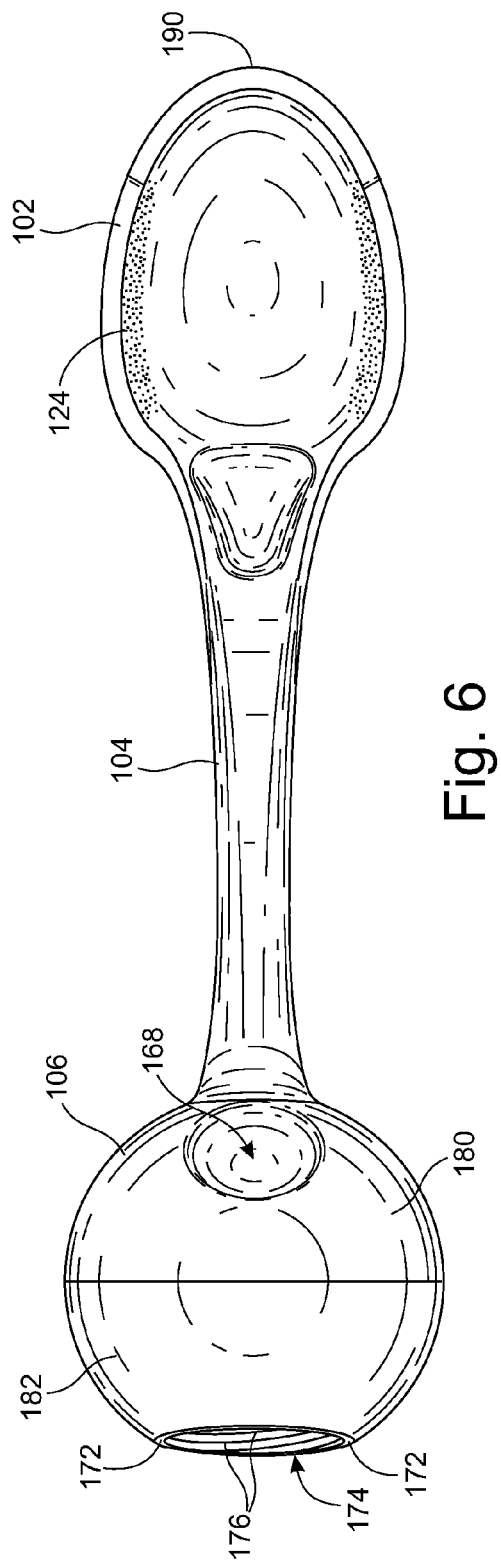
FIG. 6 shows a top view thereof.
Figure 7:
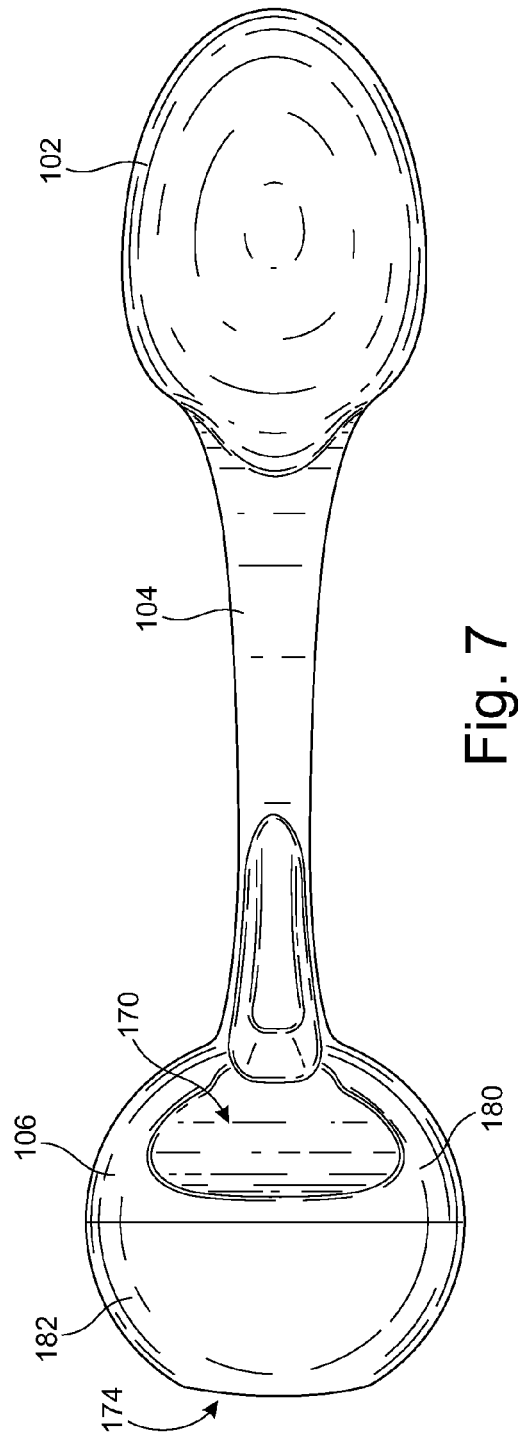
FIG. 7 shows a bottom view thereof.

In some embodiments, the two pieces 180, 182 may be substantially equal in size, thereby forming two semi-spherical halves. In some embodiments, the first piece 180 may make up a substantial portion of the spherical handle 106. The second piece 182 may simply be a cap or a lid, or vice versa. For example, as shown in FIG. 3, the depression 174 may be a screw cap lid for a resistance fits top to close the hole defined by the flattened portion 172.

Although the figures only depict a spoon, the handle 106 configuration can be applied to any utensil besides a spoon, such as a fork, knife, ladle, spatula, and the like. In such embodiments, the action portion of the utensil (i.e. the bowl 102 for the spoon 100) would contain the appropriate tool for the specific utensil (i.e. the prongs for a fork or the blade for a knife). The arch of the arm 104 and the weight distribution may be modified accordingly to provide the proper balance to allow the utensil to balance on the flattened portion 172.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A spill-resistant spoon, comprising:
   a. a handle;
   b. an arm having a first end and a second end opposite the first end, wherein the handle is attached to the arm at the first end;
   c. a bowl attached to the arm at the second end, wherein the bowl comprises a body having an inner surface and an outer surface terminating along a perimeter edge, thereby defining a first reservoir having a front portion, a rear portion opposite the front portion and attached to the arm, and two opposite side portions adjacent to the front and rear portions, and wherein the inner surface of the body is concave and the outer surface of the body is convex; and
   d. a secondary reservoir having an open face positioned at a junction where the arm meets the bowl, wherein the secondary reservoir is in open fluid communication with the bowl to allow a liquid to flow freely between the secondary reservoir and the bowl when the bowl is tilted up and down from a neutral position, and wherein a portion of the secondary reservoir is above the perimeter edge of the bowl when held in the neutral position,
   e. wherein the perimeter edge along the front portion is angled slightly downwardly relative to the perimeter edge along the two side portions,
   f. wherein the handle is generally bulbous in shape having a top area, a bottom area opposite the top area, a front area adjacent to the arm, and a back area opposite the front area, wherein the handle further comprises a flattened portion on the back area,
   g. wherein the flattened portion defines a center and a plane, wherein the spoon is configured such that an axis substantially perpendicular to the plane through the center of the flattened portion intersects a tip of the bowl, the tip being a point on the bowl farthest from the center of the flattened portion, and
   h. wherein the flattened portion has a first depression in the center thereof.

2. The utensil of claim 1, wherein the handle further comprises:
   a. a second depression along the top area towards the front area; and
   b. a concavity along the bottom area towards the front area.

3. The utensil of claim 2, wherein inner surface portions adjacent to the perimeter edge along the two side portions comprise a textured surface.

4. A spill-resistant spoon, comprising:
   a. a contoured handle generally bulbous in shape having a top area, a bottom area opposite the top area, a front area adjacent to the arm, and a back area opposite the front area, wherein the handle further comprises a flattened portion on the back area, wherein the flattened portion has a first depression in the center thereof;
   b. an arm having a first end and a second end opposite the first end, wherein the handle is attached to the arm at the first end; and
   c. a bowl attached to the arm at the second end, wherein the bowl comprises a body terminating along a perimeter edge, thereby defining a first reservoir having a front portion, a rear portion opposite the front portion and attached to the arm, and two opposite side portions adjacent to the front and rear portions, wherein the perimeter edge along the front portion is angled slightly downwardly relative to the perimeter edge along the two side portions, and wherein inner surface portions adjacent to the perimeter edge along the two side portions comprise a textured surface; and
   d. a secondary reservoir having an open face positioned at a junction where the arm meets the bowl, wherein the secondary reservoir is in open fluid communication with the bowl, and wherein a portion of the secondary reservoir is above the perimeter edge of the bowl when held in a neutral position,
   e. wherein the flattened portion defines a center and a plane, wherein the spoon is configured such that an axis substantially perpendicular to the plane through the center of the flattened portion intersects a tip of the bowl, the tip being a point on the bowl farthest from the center of the flattened portion.

\* \* \* \* \*